United States Patent
Seo

(10) Patent No.: US 12,140,685 B2
(45) Date of Patent: Nov. 12, 2024

(54) INFORMATION PROCESSING DEVICE, INFORMATION PROCESSING SYSTEM, INFORMATION PROCESSING METHOD AND STORAGE MEDIUM

(71) Applicant: CASIO COMPUTER CO., LTD., Tokyo (JP)

(72) Inventor: Munetaka Seo, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 135 days.

(21) Appl. No.: 17/702,649

(22) Filed: Mar. 23, 2022

(65) Prior Publication Data
US 2022/0308240 A1 Sep. 29, 2022

(30) Foreign Application Priority Data
Mar. 25, 2021 (JP) ................. 2021-051417

(51) Int. Cl.
*G01S 19/48* (2010.01)
*G01S 19/07* (2010.01)
(Continued)

(52) U.S. Cl.
CPC .............. *G01S 19/48* (2013.01); *G01S 19/07* (2013.01); *G01C 21/3492* (2013.01); *G01S 19/45* (2013.01); *G01S 19/46* (2013.01)

(58) Field of Classification Search
CPC .......... G01S 19/48; G01S 19/45; G01S 19/46; G01S 19/07; G01C 21/3492
(Continued)

(56) References Cited

U.S. PATENT DOCUMENTS 7,657,371 B2 * 2/2010 Hirano .................. G01S 5/0263
340/995.25
10,809,086 B2 * 10/2020 Song .................. G01C 21/3691
(Continued)

FOREIGN PATENT DOCUMENTS

JP 2005-292082 A 10/2005
JP 2006-250819 A 9/2006
(Continued)

OTHER PUBLICATIONS

Notice of Reasons for Refusal of Japanese application No. 2021-051417 mailed Sep. 24, 2024, with machine generated English translation. (12 pages).

*Primary Examiner* — Chuong P Nguyen
(74) *Attorney, Agent, or Firm* — Seed IP Law Group LLP

(57) ABSTRACT

An information processing device includes a first processor. The first processor obtains a first positioning result and a second positioning result higher in positioning accuracy than the first positioning result. In response to obtaining the first positioning result, the first processor generates, based on the first positioning result, first information having a content corresponding to the positioning accuracy of the first positioning result as information. In response to obtaining the second positioning result, the first processor generates, based on the second positioning result, second information having a content corresponding to the positioning accuracy of the second positioning result as the information. The second information is different from the first information. The first processor outputs the generated information.

20 Claims, 9 Drawing Sheets

(51) Int. Cl.
  *G01C 21/34* (2006.01)
  *G01S 19/45* (2010.01)
  *G01S 19/46* (2010.01)

(58) Field of Classification Search
  USPC ............ 342/357.28, 357.29, 357.31, 357.44
  See application file for complete search history.

(56) References Cited

U.S. PATENT DOCUMENTS

| | | | |
|---|---|---|---|
| 11,280,917 B2 * | 3/2022 | Nishimura | G01S 19/45 |
| 11,709,069 B2 * | 7/2023 | Kim | G06V 20/588 |
| | | | 701/436 |
| 2005/0222768 A1 | 10/2005 | Tauchi et al. | |
| 2006/0206260 A1 * | 9/2006 | Hirano | G01S 5/0263 |
| | | | 701/518 |
| 2009/0115659 A1 | 5/2009 | Watanabe et al. | |
| 2014/0244157 A1 * | 8/2014 | Tan | G08G 1/167 |
| | | | 701/423 |
| 2020/0056903 A1 * | 2/2020 | Tanizaki | G01C 21/3658 |
| 2021/0360372 A1 * | 11/2021 | Uzum Vella | G01C 21/3664 |
| 2023/0138903 A1 * | 5/2023 | Jin | G01C 21/3626 |
| | | | 701/533 |

FOREIGN PATENT DOCUMENTS

| | | | | |
|---|---|---|---|---|
| JP | 2009-92473 A | 4/2009 | | |
| WO | WO-2017013874 A1 * | 1/2017 | ............ | G01S 19/07 |
| WO | WO-2020121810 A1 * | 6/2020 | ......... | G01C 21/3635 |
| WO | WO-2023005961 A1 * | 2/2023 | ............ | G01S 19/46 |

* cited by examiner

INFORMATION PROCESSING DEVICE, INFORMATION PROCESSING SYSTEM, INFORMATION PROCESSING METHOD AND STORAGE MEDIUM

CROSS-REFERENCE TO RELATED APPLICATIONS

This application is based upon and claims the benefit of priority from Japanese Patent Application No. 2021-051417 filed on Mar. 25, 2021, the entire content of which is incorporated herein by reference.

BACKGROUND

Technical Field

The present disclosure relates to an information processing device, an information processing system, an information processing method and a storage medium each using positioning information.

Description of Related Art

There is a satellite positioning-related technology of receiving radio waves from positioning satellites and obtaining current position information. The current position information obtained by satellite positioning is used in navigation for showing a route(s) to a destination or used in service that selectively presents information around the current position.

Conventional civilian-use satellite positioning alone provides an accuracy of about one to several meters, in general. In recent years, there has been spreading reception of radio waves in other frequency bands with improved sending contents of signals to identify the current position with higher accuracy. Positioning satellites of the Global Positioning System (GPS) of the U.S. have been replaced by those capable of not only sending radio waves in conventional civilian-use L1 band (1.57542 GHz) but also sending radio waves in higher-accuracy L5 band (1.17645 GHz). In JP 2009-92473 A, there is disclosed a technology that enables reception of both radio waves in the L1 band and radio waves in the L5 band with low power consumption.

SUMMARY

An aspect of the present disclosure is an information processing device including a first processor that:
 obtains a first positioning result and a second positioning result higher in positioning accuracy than the first positioning result;
 in response to obtaining the first positioning result, generates, based on the first positioning result, first information having a content corresponding to the positioning accuracy of the first positioning result as information;
 in response to obtaining the second positioning result, generates, based on the second positioning result, second information having a content corresponding to the positioning accuracy of the second positioning result, the second information being different from the first information, as the information; and
 outputs the generated information.

BRIEF DESCRIPTION OF DRAWINGS

The accompanying drawings, which are incorporated in and constitute a part of the specification, illustrate embodiments, and together with the general description given above and the detailed description of the embodiments given below, serve to explain the principles of the present disclosure, wherein.

DETAILED DESCRIPTION

Hereinafter, one or more embodiments of the present disclosure will be described with reference to the drawings.

First Embodiment

Figure 1:
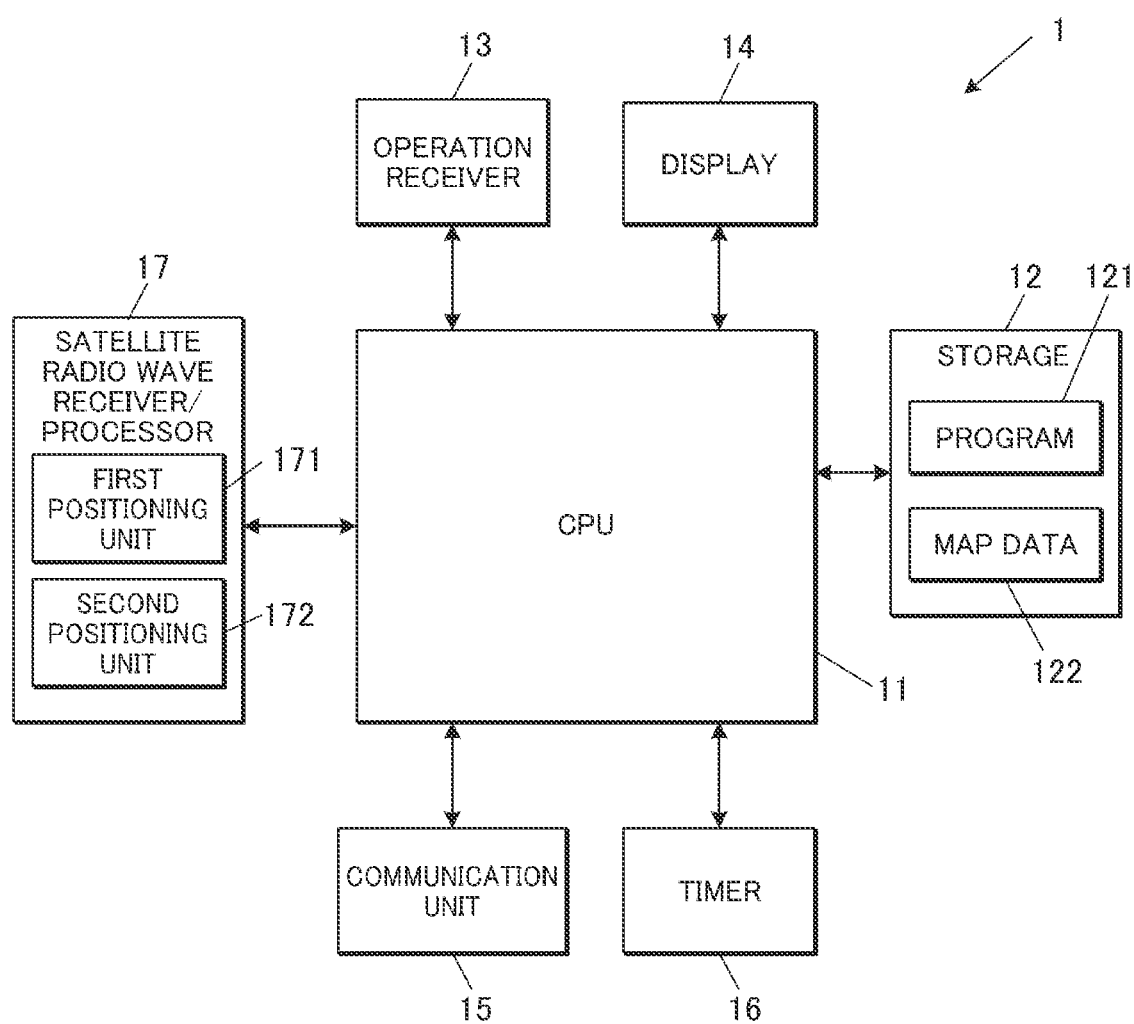
FIG. 1 is a block diagram showing a functional configuration of an electronic device.

FIG. 1 is a block diagram showing a functional configuration of an electronic device 1 that is an information processing device (computer) of a first embodiment.

The electronic device 1 is, for example, an arm-worn terminal, such as a smartwatch, or a portable terminal, such as a smartphone, and moves with its user when the user goes outside or moves and allows the user to check informed contents.

The electronic device 1 includes a CPU (Central Processing Unit) 11, a storage 12, an operation receiver 13, a display 14, a communication unit 15, a timer 16, and a satellite radio wave receiver/processor 17.

The CPU 11 is a hardware processor that performs mathematical operations and overall control of operation of the electronic device 1. The CPU 11 reads programs 121 from the storage 12 and executes these. Control contents that are performed by the CPU 11 include navigation operation to assist the user in moving. There may be provided one or more CPUs 11. In the case where two or more CPUs 11 are provided, they may operate in parallel for a process, or may perform separate processes independently. The CPUs 11 may include CPUs that are suitably designed for specific applications.

The storage 12 includes a volatile memory (RAM) and a nonvolatile memory. The volatile memory provides the CPU 11 with a memory space for work and stores temporary data. The nonvolatile memory stores the programs 121, setting data and application data. The programs 121 are control programs for control processes that are performed by the CPU 11. The control programs include a navigation control program (navigation application) for the abovementioned navigation operation. The application data includes map data 122 that is used in the navigation application.

The operation receiver 13 receives input operations from outside, such as the user, converts the operation contents into input signals, and outputs the input signals to the CPU 11. The operation receiver 13 may include a push-button switch and a touchscreen.

The display 14 includes a digital display screen, and performs displaying on the digital display screen under the control of the CPU 11. The digital display screen is, for example, an LCD (Liquid Crystal Display) screen, but not limited thereto. The digital display screen may be overlaid on the abovementioned touchscreen.

The communication unit 15 controls communications with external devices via Internet lines or the like. The communications standards that can be controlled thereby are not particularly limited but include various wireless LAN (Local Area Network) standards.

The timer 16 keeps the current date and time by counting clock signals of a certain frequency output from a not-shown oscillation circuit.

The satellite radio wave receiver/processor 17 performs position calculations by receiving and using radio waves from the GNSS (Global Navigation Satellite System) positioning satellites or the like, thereby performing satellite positioning (positioning) to identify the current position of its device. The satellite radio wave receiver/processor 17 includes a first positioning unit 171 and a second positioning unit 172. Although not particularly limited, the first positioning unit 171 demodulates radio waves in the L1 band (first satellite signals, first radio signals) in the GPS (Global Positioning System) to decode signals (navigation messages) and perform position calculations, and sends positioning results (first positioning results) to the CPU 11, and the second positioning unit 172 demodulates radio waves in the L5 band (second satellite signals, second radio signals) in the GPS to decode signals (navigation messages) and perform position calculations, and sends positioning results (second positioning results) to the CPU 11. Although not particularly limited, the first positioning unit 171 and the second positioning unit 172 may be each or collectively formed as a module including an antenna, a receiving circuit (RF block) that extracts signals, and a control circuit (baseband circuit). The control circuit includes a CPU and a dedicated logic circuit that performs demodulation, decoding, position calculations and so forth to calculate the current position.

The navigation messages sent from the GPS positioning satellites by being carried by radio waves in the L1 band and those sent therefrom by being carried by radio waves in the L5 band are different in format. Regarding the latter, correction accuracy of position identification accuracy of the positioning satellites and so forth have been improved. With these, positioning accuracy (L5 accuracy) of results of positioning by reception in the L5 band (L5 positioning) is higher than that (L1 accuracy) of results of positioning by reception in the L1 band (L1 positioning). However, the case of reception in the L5 band takes more time for decoding necessary navigation messages and obtaining a positioning result first time (at cold start) than the case of reception in the L1 band.

In the satellite radio wave receiver/processor 17, the first positioning unit 171 and the second positioning unit 172 can perform positioning in parallel. The satellite radio wave receiver/processor 17 first obtains a positioning result by the first positioning unit 171 and outputs it to the CPU 11, and thereafter, in response to obtaining a positioning result by the second positioning unit 172, replaces the outputting positioning result with the positioning result by the second positioning unit 172. The satellite radio wave receiver/processor 17 outputs each positioning result to the CPU 11 with identification information attached, the identification information indicating which positioning result is being output, a positioning result by the first positioning unit 171 (L1 positioning result) or a positioning result by the second positioning unit 172 (L5 positioning result). If the satellite radio wave receiver/processor 17 does not obtain an L5 positioning result (L5 positioning fails), the satellite radio wave receiver/processor 17 may go back to output an L1 positioning result(s) to the CPU 11. Alternatively, the satellite radio wave receiver/processor 17 may keep outputting both L1 positioning results and L5 positioning results to the CPU 11.

The electronic device 1 may further include a not-shown measurement sensor and a not-shown informing unit. Examples of the measurement sensor include an acceleration sensor and a direction sensor (geomagnetic field sensor) for identifying the speed and the direction of movement. Examples of the informing unit include an informing unit that generates beeps or vibrations for informing that its device is moving properly along a navigation route or moving improperly.

Next, the navigation operation of this embodiment will be described.

In response to obtaining the current position of itself and the position of a destination, the electronic device 1 performs the navigation operation of identifying a proper route from the current position to the destination by referring to the map data 122, and generating and outputting navigation information (information using a positioning result(s)) showing the identified route on a map. In the electronic device 1 of this embodiment, the navigation information is output to the display 14. The current position is obtained on the basis of a positioning result by the satellite radio wave receiver/processor 17. The destination is set, for example, by the user making an input operation(s) on the touchscreen of the operation receiver 13 to specify a point on the map displayed by the display 14 or to input numerical values, such as latitude-longitude information.

Figure 2:
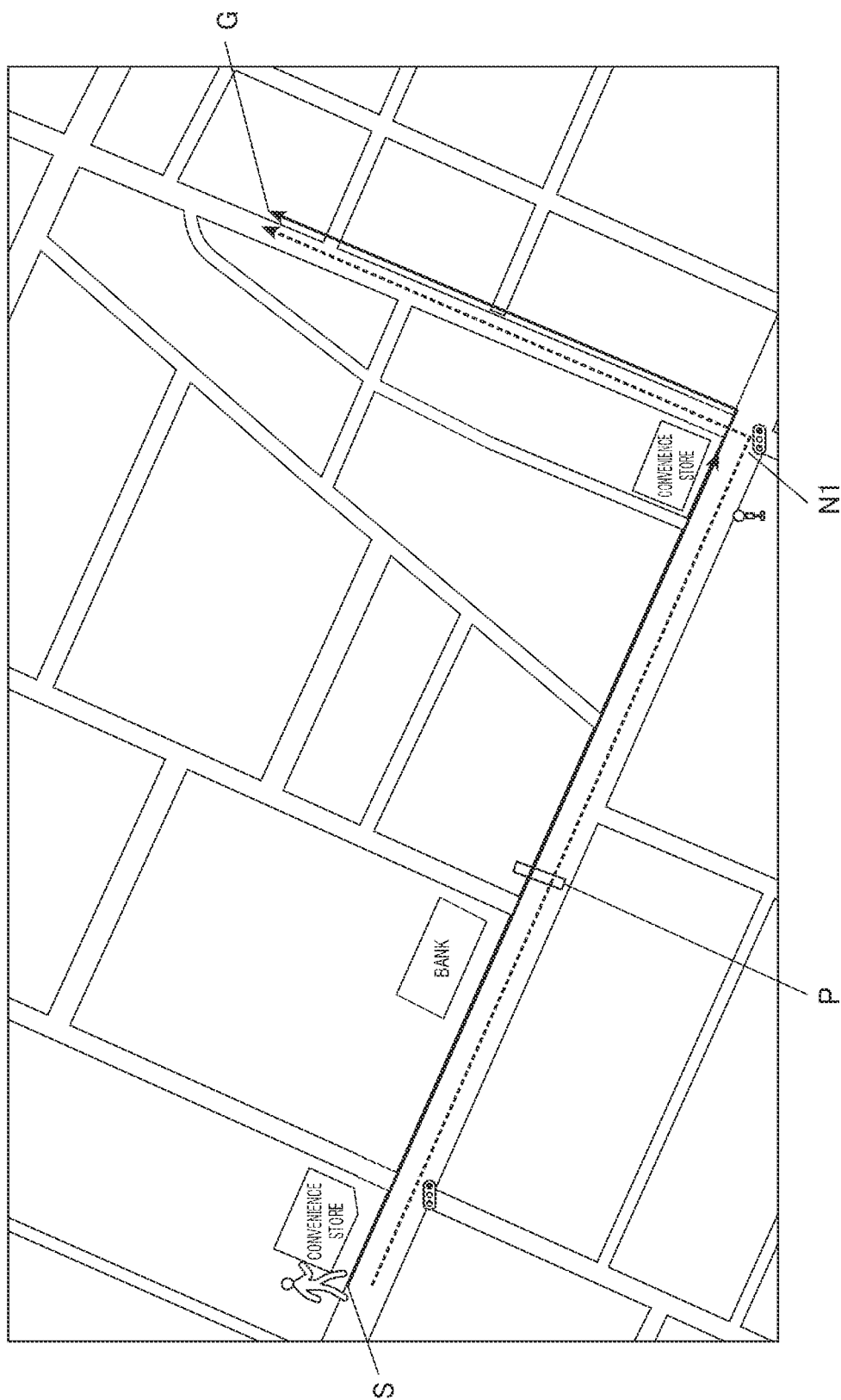
FIG. 2 shows an example of navigation display of a first embodiment.

FIG. 2 shows an example of navigation display.

In response to a destination G being set and a current position S being obtained by the first positioning unit 171 of the satellite radio wave receiver/processor 17, a route indicated by a broken line is identified. In the electronic device 1, navigation information showing this route is generated, and output to and displayed by the display 14. Although L1 accuracy is sufficient to identify a road (street), it is sometimes insufficient to make a significant distinction between the right side and the left side of the road. The navigation information generated on the basis of an L1 positioning result (first information) has a content(s) corresponding to the positioning accuracy of the L1 positioning result, and the center (center line) of the road along the route is shown.

Thereafter, in response to an L5 positioning result starting to be obtained at a point P on the user's way to the destination G from the current position S, the positioning accuracy increases to L5 accuracy, with which a distinction between the right side and the left side of a road can be made. In this embodiment, the user walking on the left side of the road can be identified. As a result, in the electronic device 1, as navigation information showing a route from the point P to the destination G, navigation information based on the higher-accuracy L5 positioning result and corresponding to the positioning accuracy of the L5 positioning result (second information) is generated, and output by replacing the first information.

In this embodiment, the navigation information (second information) shows that the user holding the electronic device 1 should keep moving forward along the sidewalk on the left side of the road, go straight to cross a road at a signalized intersection N1 near a convenience store and then turn left, and move forward on the right side of the road. After the user turns left at the signalized intersection N1, there is no signal to the destination G. Hence, guiding the user to cross the road at the signalized intersection N1 first, namely, before turning left, keeps the user from running the risk of crossing the road (roadway) at a point having no signal and from walking past the destination G to a signal ahead and coming back to the destination G.

That is, the electronic device 1 can perform navigation from an early stage with a first positioning result obtained from the first positioning unit 171, and if the point P, at which a second positioning result by the second positioning unit 172 is obtained, is in front of the signalized intersection N1, can update the navigation information even in the middle of the navigation to further preferable navigation information because the positioning accuracy is improved, and provide the user with this further preferable navigation information.

Figure 3:
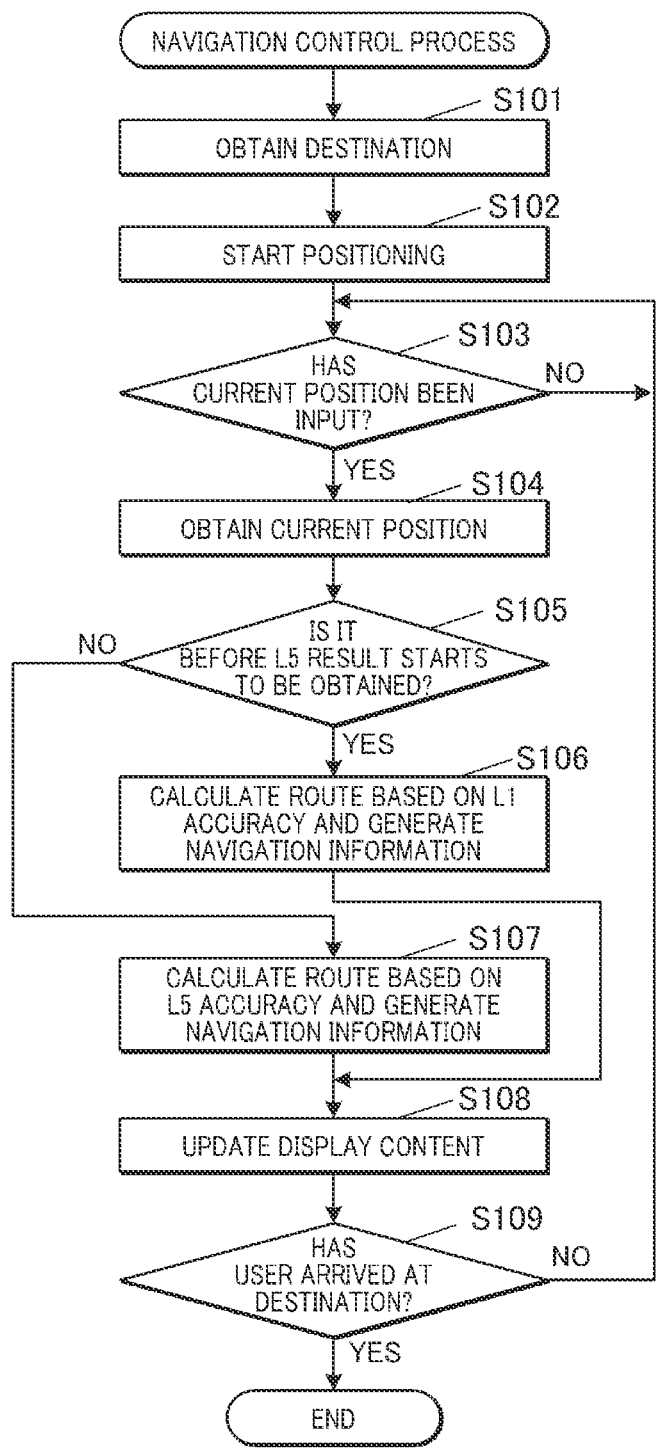
FIG. 3 is a flowchart showing a control procedure of a navigation control process of the first embodiment.

FIG. 3 is a flowchart showing a control procedure by the CPU 11 in a navigation control process that is performed by the electronic device 1.

This navigation control process includes an information processing method of the present disclosure, and is started by the CPU 11 as a first processor obtaining an input signal corresponding to an execution operation for the navigation application received by the operation receiver 13, for example.

In response to the navigation control process being started, the CPU 11 obtains a destination (Step S101). For example, the CPU 11 causes the display 14 to display a map image on the digital display screen, and identifies and obtains the position of a destination indicated by a setting input operation made by the user.

The CPU 11 activates a satellite radio wave receiver/processor of its device (satellite radio wave receiver/processor 17 in this embodiment) to start positioning (Step S102). This Step S102 may be performed in parallel with or before Step S101.

The CPU 11 determines whether a new current position has been input to itself (CPU 11) from the satellite radio wave receiver/processor 17 (Step S103). This "new current position" is a current position input after the last Step S103 (after the navigation control process is started if this is the first Step S103). The new current position may be either an L1 positioning result or an L5 positioning result. If the CPU 11 determines that a new current position has not been input to itself (Step S103; NO), the CPU 11 repeats Step S103.

If the CPU 11 determines that a new current position has been input to itself (Step S103; YES), the CPU 11 obtains the input new current position (Step S104). The CPU 11 determines whether it is before the second positioning unit 172 starts to obtain an L5 positioning result, namely, determines whether the obtained new current position is an L1 positioning result (Step S105). If the CPU 11 determines that it is before the second positioning unit 172 starts to obtain an L5 positioning result (Step S105; YES), the CPU 11 identifies a route on the basis of the accuracy of L1 positioning and generates navigation information (Step S106). Then, the CPU 11 proceeds to Step S108.

If, in Step S105, the CPU 11 determines that it is after the second positioning unit 172 starts to obtain an L5 positioning result, namely, determines that the obtained new current position is an L5 positioning result (Step S105; NO), the CPU 11 identifies a route on the basis of the accuracy of L5 positioning and generates navigation information (Step S107). Then, the CPU 11 proceeds to Step S108.

In Step S108, to which the CPU 11 proceeds from Step S106 or Step S107, the CPU 11 updates display contents of the display 14 on the basis of the navigation information (Step S108). The CPU 11 determines whether the user has arrived at the destination, namely, determines whether the current position matches the destination (whether the destination is within a predetermined distance) (Step S109). If the CPU 11 determines that the user has not arrived at the destination yet (Step S109; NO), the CPU 11 returns to Step S103. If the CPU 11 determines that the user has arrived at the destination (Step S109; YES), the CPU 11 ends the navigation control process.

Second Embodiment

Next, as a second embodiment of the present disclosure, an information processing system using a plurality of electronic devices will be described.

Figure 4:
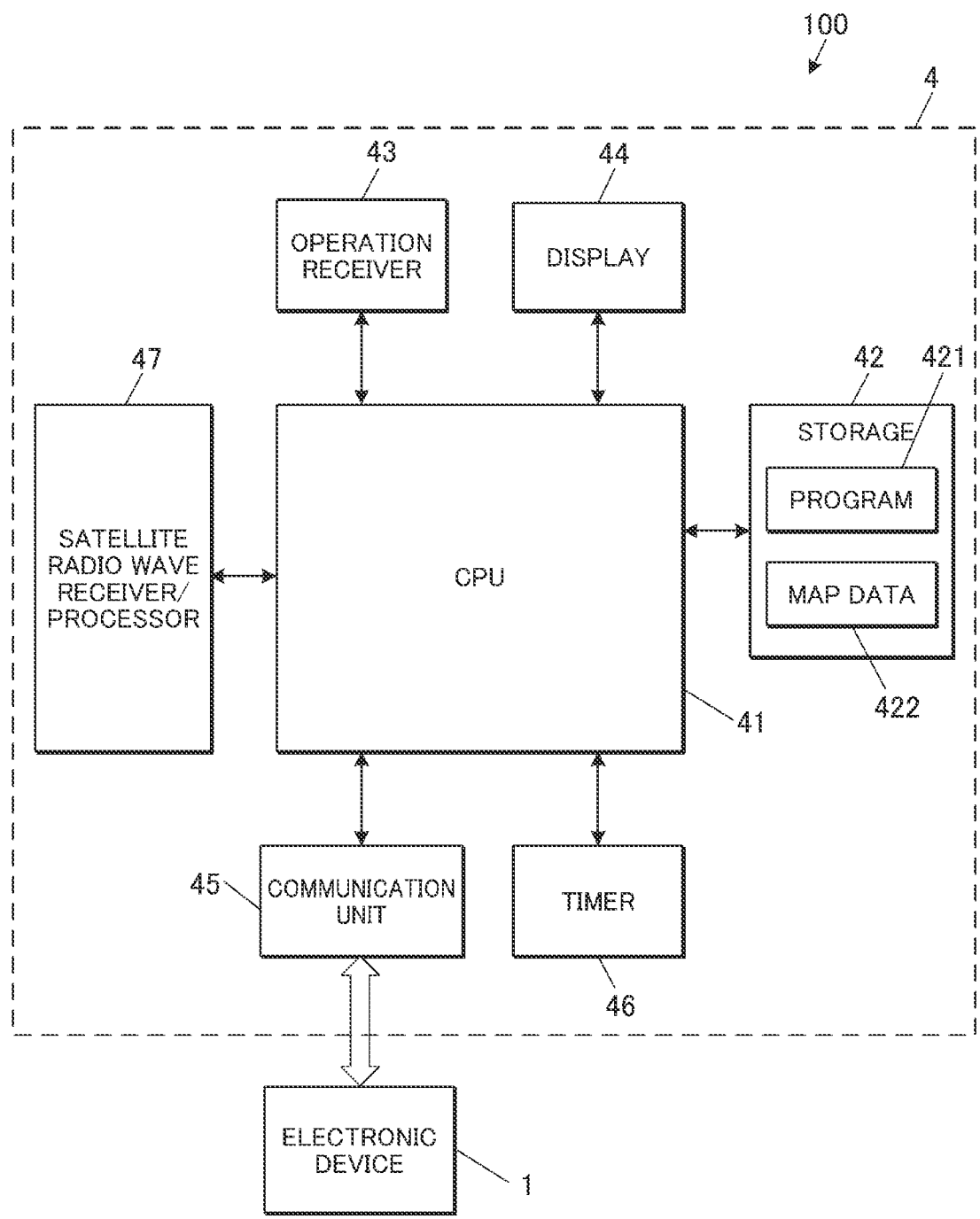
FIG. 4 is a block diagram to explain a functional configuration of an information processing system of a second embodiment.

FIG. 4 is a block diagram to explain a functional configuration of an information processing system 100 of this embodiment.

The information processing system 100 includes an electronic device 4 that is an information processing device (computer) of the second embodiment and the above-described electronic device 1 as an external device to the electronic device 4.

The electronic device 4 is not limited to a portable device but may be a navigation device attached to a specific mobile body, in this embodiment, to a taxi.

In this embodiment, the electronic device 1 is a portable device owned by a taxi user or a person (guide, attendant, porter, etc.) who takes the taxi user to a get-in position where the taxi user gets in a taxi.

The electronic device 4 includes a CPU 41 (first processor in this embodiment), a storage 42, an operation receiver 43, a display 44, a communication unit 45 (first communication unit in this embodiment), a timer 46, and a satellite radio wave receiver/processor 47. The CPU 41, the storage 42 that stores programs 421 and map data 422, the operation receiver 43, the display 44, the communication unit 45 and the timer 46 are the same as the CPU 11, the storage 12, the operation receiver 13, the display 14, the communication unit 15 and the timer 16 in functional configuration, respectively, and hence their detailed descriptions will be omitted. The (same) functional configuration herein may not include specific performance (operating frequencies of the CPUs 11, 41, storage types and storage capacities of the storages 12, 42, the number(s) of pixels and brightness values of the displays 14, 44, reception efficiencies of the satellite radio wave receiver/processors 17, 47, etc.) and operation type (operating systems (OS) for processes of the CPUs 11, 41, receiving devices of the operation receivers 13, 43, etc.).

The communication unit 45 can communicate with the electronic device 1 via the Internet or the like.

The satellite radio wave receiver/processor 47 performs positioning by receiving and using radio waves in the L1 band only, which is different from the satellite radio wave receiver/processor 17. In this embodiment, the first positioning unit 171 of the satellite radio wave receiver/processor 17 corresponds to a third positioning unit that performs positioning by receiving and using third radio signals (radio waves in the L1 band) of the present disclosure, and the second positioning unit 172 of the satellite radio wave receiver/processor 17 corresponds to a fourth positioning unit that performs positioning by receiving and using fourth radio signals (radio waves in the L5 band) of the present disclosure.

In this information processing system 100, the electronic device 4 obtains positioning information from the electronic device 1, and performs navigation with a destination that is set in accordance with the positioning information. For example, the programs 421 of the electronic device 4 include a vehicle-dispatch program, which taxi drivers use, and the programs 121 of the electronic device 1 include a taxi-dispatch request application, which taxi users (customers/passengers, etc.) use.

In response to executing the vehicle-dispatch request application of the electronic device 1, thereby operating to make a vehicle-dispatch request, the CPU 11 (second processor in this embodiment) first sends/outputs current position information based on L1 positioning obtained from the first positioning unit 171 of the satellite radio wave receiver/processor 17 of the electronic device 1 to a server of a vehicle-dispatch center or directly to the electronic device 4 via the communication unit 15 (second communication unit in this embodiment), and thereafter sends/outputs current position information based on L5 positioning obtained from the second positioning unit 172 to the server of the vehicle-dispatch center or directly to the electronic device 4 via the communication unit 15. The electronic device 1 puts, in sending data of each current position information, information on the type of radio signals received to obtain the current position information or at least information on the accuracy.

In the case where the electronic device 1 sends the current position information to the server of the vehicle-dispatch center, the server determines a taxi to dispatch to the position of the electronic device 1 on the basis of pieces of position information of taxies, which the server obtains in real-time, and L1-accuracy current position information of the electronic device 1, which has made the vehicle-dispatch request, and sends the vehicle-dispatch request and the position of the electronic device 1 to the electronic device 4 of the taxi. In response to receiving the vehicle-dispatch request from the vehicle-dispatch center or the electric device 1 via the communication unit 45, the electronic device 4 identifies a route to the position of the electronic device 1 on the basis of the current position of itself and the position of the electronic device 1, generates navigation information, and causes the display 44 to display the navigation information. After obtaining the L1-accuracy position information as the position of the electronic device 1, if the electronic device 4 obtains L5-accuracy position information, the electronic device 4 can identify, for example, on which side of the road the electronic device 1 is, and hence can identify on which lane the taxi should be when arriving at the site, a lane in a direction of travel or a lane in the other direction of travel.

Figure 5:
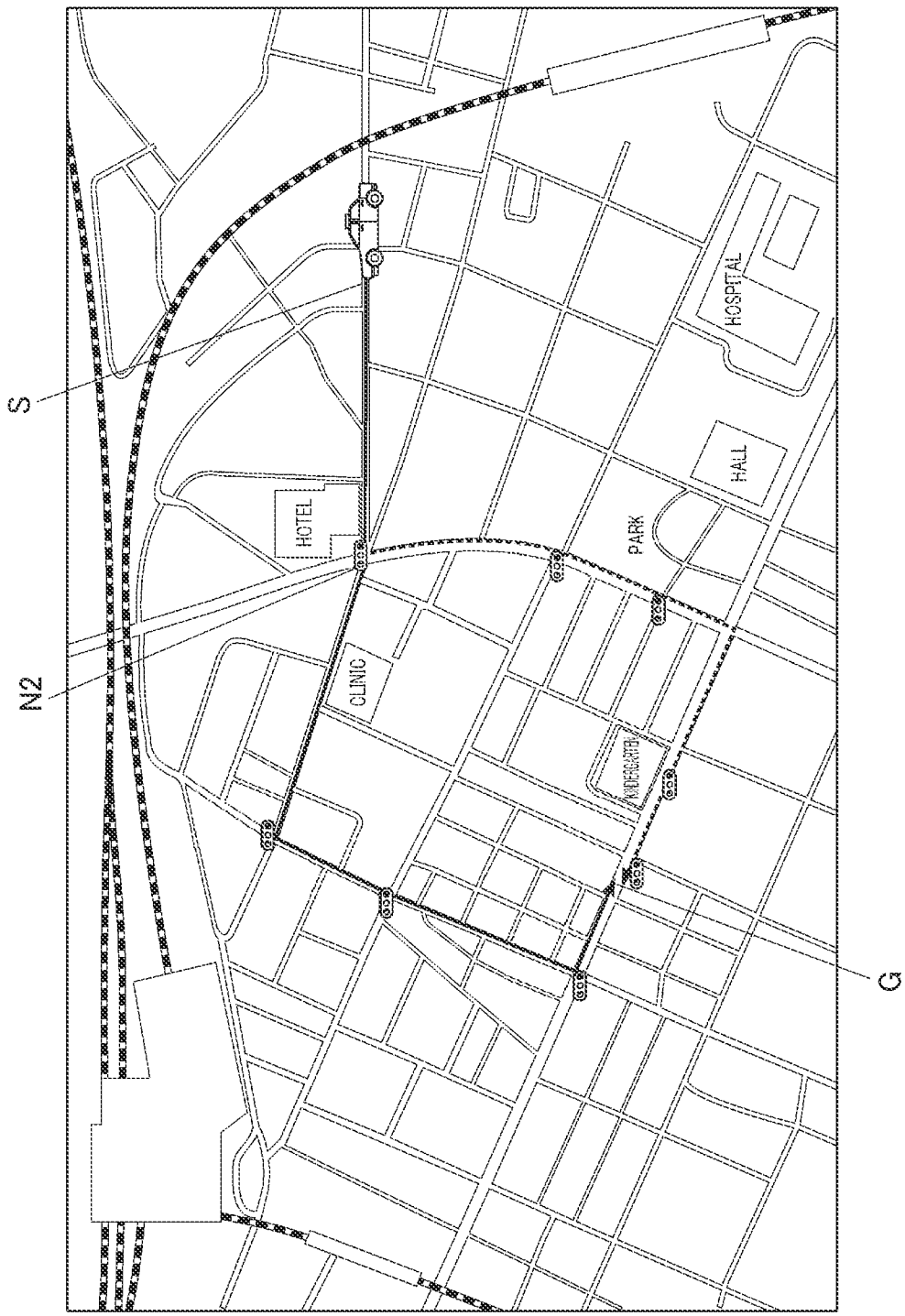
FIG. 5 shows an example of a display screen of a vehicle-dispatch navigation system in an electronic device of the second embodiment.

FIG. 5 shows an example of a display screen of a vehicle-dispatch navigation system (automotive navigation system) in the electronic device 4.

The direction of travel (direction of a vehicle body) of a taxi at its current position may be identified with a measurement sensor or the like. In this embodiment, although a map is displayed as a fixed north-up map, it may be displayed as a map that rotates such that the direction of travel of the taxi is the upward direction of the map.

A route from a current position S of the taxi to the position of the electronic device 1 that is a destination G branches at a branching point N2 into a route indicated by a solid line and a route indicated by a dotted line for respective lanes at the destination G. While L1-accuracy position information is obtained, only one of these routes may be shown, or both of these routes may be shown. In either case, the branching point N2 is displayed so as to be recognized by the taxi driver for sure.

In the case where the electronic device 4 obtains L5-accuracy position information and thereby more accurately identifies the position of the electronic device 1 (destination G) before the taxi arrives at the branching point N2, the electronic device 4 choses one of the routes in accordance with the information and makes a switch to display the chosen route only. If the electronic device 4 is unlikely to obtain (does not obtain) L5-accuracy position information before the taxi arrives at the branching point N2, the taxi driver who knows the branching point N2 can wait in front of the branching point N2. Alternatively, the taxi driver may proceed forward along one of the routes without waiting in front of the branching point N2. Thereafter, in response to obtaining L5-accuracy position information, the electronic device 4 identifies and displays the optimal route at the time on the basis of the obtained information.

Figure 6:
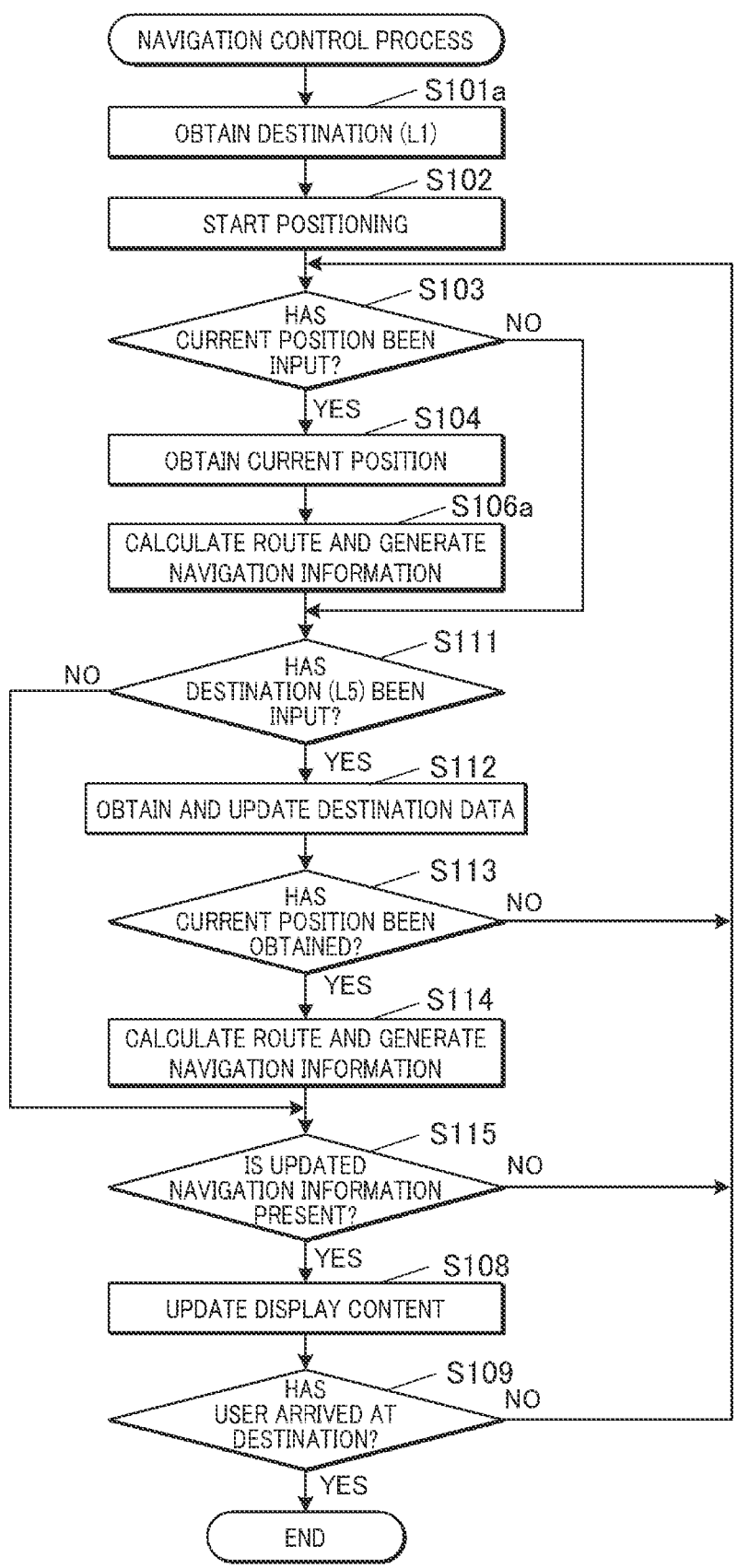
FIG. 6 is a flowchart showing a control procedure of a navigation control process of the second embodiment.

FIG. 6 is a flowchart showing a control procedure by the CPU 41 in a navigation control process that is performed by the electronic device 4.

This navigation control process includes another information processing method of the present disclosure, and is started by the CPU 41 receiving a vehicle-dispatch request from a taxi-dispatch center or the electronic device 1, for example. This navigation control process is the same as the navigation control process of the first embodiment shown in FIG. 3 except that Step S101 and Step S106 are replaced by Step S101a and Step S106a, respectively, Step 105 is removed, and Step S111 to Step S115 are added. Detailed descriptions of the steps same as those of the first embodiment will be omitted.

In response to the navigation control process being started, the CPU 41 obtains L1-accuracy destination information from a device (electronic device 1) that has made the vehicle-dispatch request (Step S101a). Then, the CPU 41 proceeds to Step S102 and activates a satellite radio wave receiver/processor of its device (satellite radio wave receiver/processor 47 of the electronic device 4 in this embodiment) to start positioning (Step S102).

In Step S103, if the CPU 41 determines that a new current position has been input (Step S103; YES), the CPU 41 obtains the input current position (Step S104), and identifies a travel route on the basis of the obtained current position and the obtained destination (position of the electronic device 1) and generates navigation information (Step S106a). While the destination is not obtained with L5 accuracy, by taking account of the abovementioned case where the road at the destination has lanes in respective directions of travel (or by determining its necessity from the map data 122), the CPU 41 may identify travel routes for the respective lanes. Then, the CPU 41 proceeds to Step S111. If the CPU 41 determines that a new current position has not been input (Step S103; NO), the CPU 41 proceeds to Step S111.

In Step S111, the CPU 41 determines whether L5-accuracy destination information has been input to itself (CPU 41) from the electronic device 1 via the communication unit 45 (Step S111). If the CPU 41 determines that L5-accuracy destination information has been input to itself (Step S111; YES), the CPU 41 obtains the L5-accuracy destination data, and updates the L1-accuracy destination data with the obtained L5-accuracy destination data (Step S112). The CPU 41 determines whether it has obtained the current position at least once (Step S113). If the CPU 41 determines that it has not obtained (has never obtained) the current position (Step S113; NO), the CPU 41 returns to Step S103.

If the CPU 41 determines that it has obtained the current position at least once (Step S113; YES), the CPU 41 identifies a route to the destination on the basis of the updated destination and the current position and generates navigation information showing the route (Step S114). In the case where the navigation information generated in Step S106a has not been displayed, the CPU 41 overwrites the not-displayed navigation information with the navigation information generated in Step S114. Then, the CPU 41 proceeds to Step S115.

In Step S111, if the CPU 41 determines that L5-accuracy destination information has not been input to itself (Step S111; NO), the CPU 41 proceeds to Step S115.

In Step S115, to which the CPU 41 proceeds from Step S111 or Step S114, the CPU 41 determines whether updated navigation information is present, namely, whether not-yet-displayed navigation information is present (Step S115). If the CPU 41 determines that updated navigation information is present (Step S115; YES), the CPU 41 proceeds to Step S107. If the CPU 41 determines that updated navigation information is not present (Step S115; NO), the CPU 41 returns to Step S103.

Figure 7:
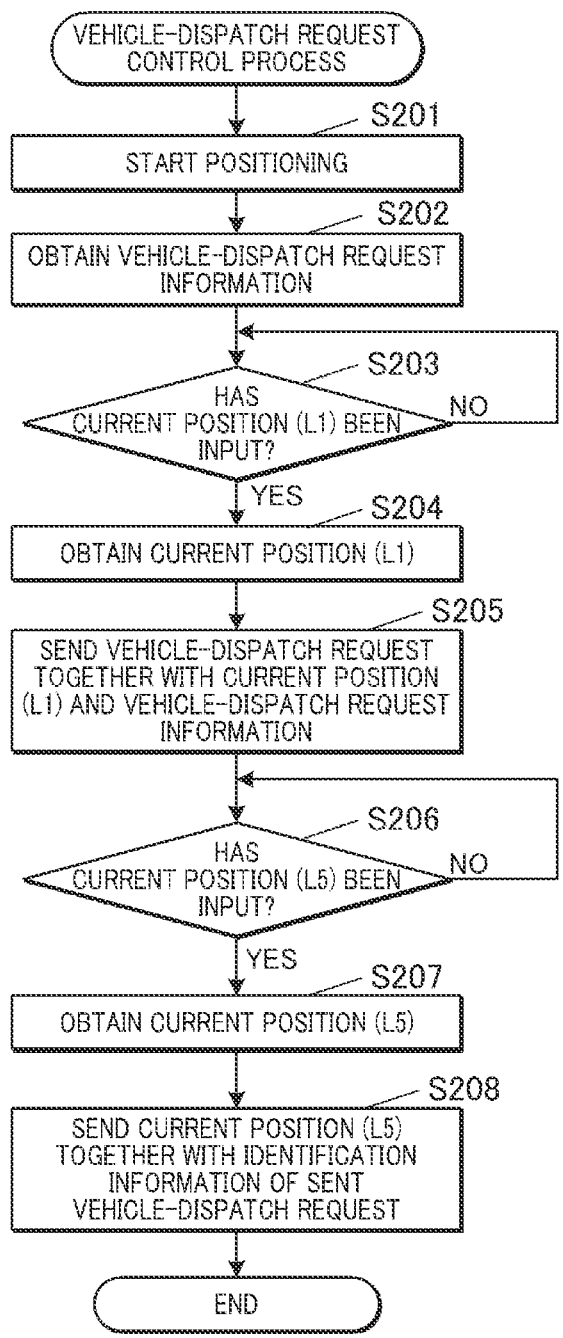
FIG. 7 is a flowchart showing a control procedure of a vehicle-dispatch request control process of the second embodiment.

FIG. 7 is a flowchart showing a control procedure by the CPU 11 in a vehicle-dispatch request control process that is performed by the electronic device 1. This vehicle-dispatch request control process is started by the CPU 11 executing the taxi-dispatch request application, for example.

The CPU 11 activates the satellite radio wave receiver/processor 17 to start positioning (Step S201). The CPU 11 obtains vehicle-dispatch request information on the basis of input operations on the operation receiver 13 (Step S202). The vehicle-dispatch request information may include, for example, a requester's name or identification information, request information on the size and/or type of a vehicle or the number of persons to get in a vehicle, information on a specific period of time from sending of a vehicle-dispatch request to arrival of a vehicle or date and time when a vehicle is required, and/or information on a planned drop-off location. The vehicle-dispatch request information may include default settings or settings preset by the user and stored in the storage 12.

The CPU 11 determines whether current position information by L1 positioning has been input to itself (CPU 11) from the satellite radio wave receiver/processor 17 (Step S203). If the CPU 11 determines that current position information by L1 positioning has not been input to itself (Step S203; NO), the CPU 11 repeats Step S203. If the CPU 11 determines that current position information by L1 positioning has been input to itself (Step S203; YES), the CPU 11 obtains the input current position information by L1 positioning (Step S204).

The CPU 11 sets the current position (L1) as the get-in position and sends a vehicle-dispatch request together with this current position (L1) and the vehicle-dispatch request information via the communication unit 15 (Step S205). They are sent, as described above, to the server of the vehicle-dispatch center or the navigation device (electronic device 4) of a taxi, for example. The current position by L1 positioning is a first positioning result in the electronic device 4. Unique identification information is attached to the vehicle-dispatch request at the time.

The CPU 11 determines whether current position information by L5 positioning has been input to itself (CPU 11) from the satellite radio wave receiver/processor 17 (Step S206). If the CPU 11 determines that current position information by L5 positioning has not been input to itself (Step S206; NO), the CPU 11 repeats Step S206.

If the CPU 11 determines that current position information by L5 positioning has been input to itself (Step S206; YES), the CPU 11 obtains the input current position information by L5 positioning (Step S207). The CPU 11 sends the current position information by L5 positioning as updated information of the get-in position together with the identification information of the sent vehicle-dispatch request via the communication unit 15 (Step S208). The current position by L5 positioning is a second positioning result in the electronic device 4. Then, the CPU 11 ends the vehicle-dispatch request control process.

Third Embodiment

As a third embodiment, an information processing system 100a will be described.

Figure 8:
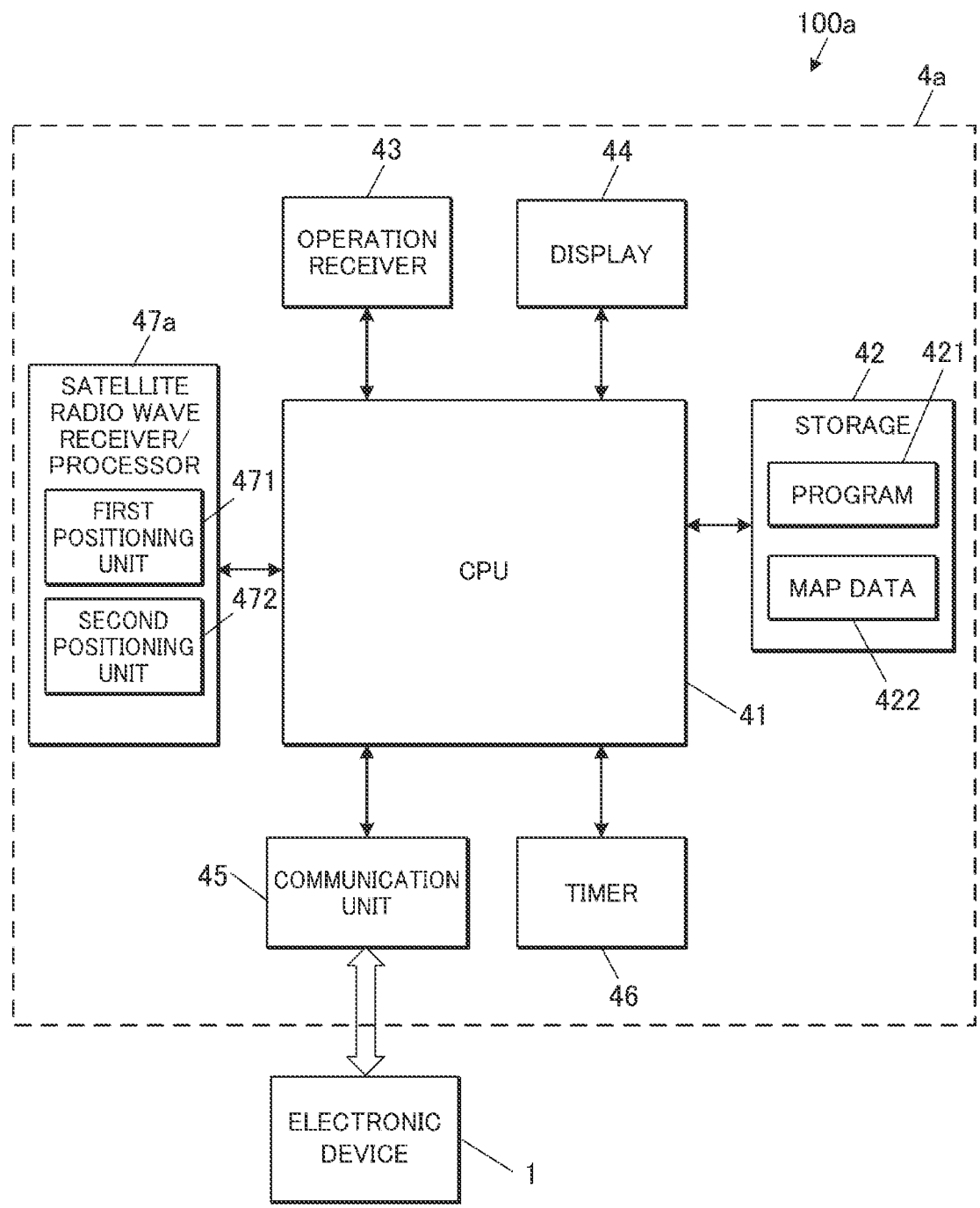
FIG. 8 is a block diagram to explain a functional configuration of an information processing system of a third embodiment.

FIG. 8 is a block diagram to explain a functional configuration of the information processing system 100a of the third embodiment.

The information processing system 100a includes the above-described electronic device 1 and an electronic device 4a. The electronic device 4a is, like the electronic device 4 of the second embodiment, a navigation device of a taxi or the like, and is an information processing device (computer) of this embodiment. The electronic device 4a includes a satellite radio wave receiver/processor 47a instead of the satellite radio wave receiver/processor 47 of the electronic device 4 of the second embodiment. The satellite radio wave receiver/processor 47a includes a first positioning unit 471 that receives radio waves in the L1 band and a second positioning unit 472 that receives radio waves in the L5 band. The other components of the electronic device 4a are the same as those of the electronic device 4 and denoted by the same reference signs, and their detailed descriptions will be omitted.

In this information processing system 100a, the first positioning unit 171 of the electronic device 1, as a third positioning unit, receives radio waves in the L1 band (third radio signals), and the second positioning unit 172 of the electronic device 1, as a fourth positioning unit, receives radio waves in the L5 band (fourth radio signals). Hence, in each of the electronic devices 1, 4a, the positioning accuracy is switched from L1 accuracy to L5 accuracy in the middle of navigation.

In the electronic device 4a, the CPU 41 as the first processor obtains positioning results by the first positioning unit 471 as first positioning results, and obtains positioning results by the second positioning unit 472 as second positioning results. The CPU 41 also obtains, via the communication unit 45, positioning results by the first positioning unit 171 sent/output from the electronic device 1 via the communication unit 15 as third positioning results, and obtains, via the communication unit 45, positioning results by the second positioning unit 172 sent/output from the electronic device 1 via the communication unit 15 as fourth positioning results.

The electronic device 4a can obtain and use the congestion status of a road(s) in identifying a route(s). In response to obtaining L5-accuracy position information, the electronic device 4a may determine a lane on the basis of the congestion status. Examples of the lane herein include lanes in the same direction of travel, such as a right-turn lane and a left-turn lane. For example, the electronic device 4a may set a route with a point to turn right/left changed in accordance with the congestion status of each lane.

In navigation operation of the electronic device 4a, the CPU 41 determines where to turn right/left by using the congestion status, and also may cause the display 44 and/or an informing unit to inform the user about where to turn right/left or the like in advance, and by determining before turning right/left whether the user (vehicle) is on a proper lane, cause the display 44 and/or the informing unit to warn or inform the user about the determination result.

Figure 9:
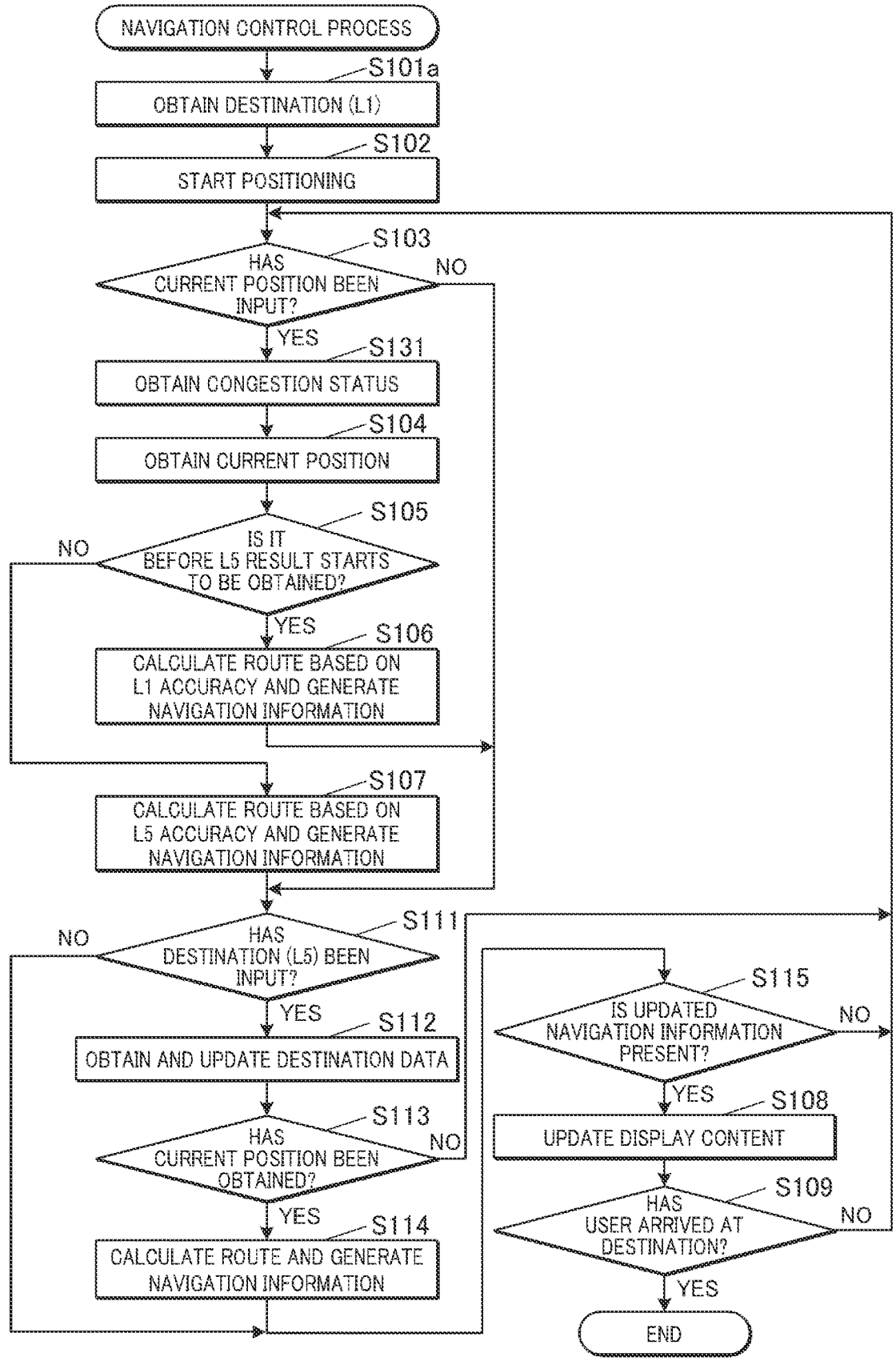
FIG. 9 is a flowchart showing a control procedure of a navigation control process of the third embodiment.

FIG. 9 is a flowchart showing a control procedure by the CPU 41 in a navigation control process that is performed by the electronic device 4a of the information processing system 100a.

The navigation control process of the third embodiment includes another information processing method of the present disclosure, and is a combination of Step S102 to Step S109 of the navigation control process of the first embodiment shown in FIG. 3 and Step S101a and Step S111 to Step S115 of the navigation control process of the second embodiment shown in FIG. 6 with Step S131 added. Detailed descriptions of the steps same as those described above will be omitted.

In this navigation control process, in Step S103, if the CPU 41 determines that a new current position has been input (Step S103; YES), the CPU 41 obtains road congestion status information from outside (Step S131). The CPU 41 may receive the road congestion status information, for example, from an external road information service server via the communication unit 45. Then, the CPU 41 proceeds to Step S104.

The obtained road congestion status information is used in Step S106, Step S107 and Step S114, in which the CPU identifies a route(s) and generates navigation information. In Step S106 (and Step S114), the CPU 41 may choose/select a route in accordance with an L1-accuracy current position and a destination. In Step S107 and Step S114, the CPU 41 may choose/select a route and a lane in accordance with an L5-accuracy current position and/or an L5-accuracy destination.

The information generated in Step S106 with the current position and the destination both obtained with L1 accuracy is third information. The information generated in Step S106 with the current position obtained with L1 accuracy and the destination obtained with L5 accuracy is fifth information.

The information generated in Step S107 with the current position obtained with L5 accuracy and the destination obtained with L1 accuracy is fourth information. The information generated in Step S107 with the current position and the destination both obtained with L5 accuracy is sixth information.

The information generated in Step S114 with the current position obtained with L1 accuracy and the destination obtained with L5 accuracy is fifth information. The information generated in Step S114 with the current position and the destination both obtained with L5 accuracy is sixth information.

The third information to the sixth information are different from one another.

As described above, as an example of the information processing device of the above embodiments, the electronic device 1 of the first embodiment includes the CPU 11 as the first processor. The CPU 11 obtains a first positioning result (e.g., L1 positioning result) (S104 in FIG. 3); obtains a second positioning result (e.g., L5 positioning result) higher in positioning accuracy than the first positioning result (S104 in FIG. 3); and generates and outputs information using each obtained positioning result. The CPU 11 as the first processor, in response to obtaining the first positioning result, generates, on the basis of the first positioning result, first information having a content(s) corresponding to the positioning accuracy of the first positioning result (Step S106 in FIG. 3); in response to obtaining the second positioning result, generates, on the basis of the second positioning result, second information having a content(s) corresponding to the positioning accuracy of the second positioning result, the second information being different from the first information (Step S107 in FIG. 3); and outputs the generated first information and second information for display (Step S108 in FIG. 3).

Thus, in the case where two types of positioning results of different levels of accuracy can be obtained, when a first positioning result of lower accuracy is obtained, information is generated with a content(s) at accuracy available by this first positioning result and output. This allows the user, who is eager to obtain information, to make a provisional decision and a provisional movement without keeping him/her waiting for a long time, namely, until a second positioning result is obtained. Thereafter, as soon as a second positioning result is obtained, higher-accuracy information is output by replacing the outputting information. This allows the user (with whom information is provided) to, on the basis of a higher-accuracy position, narrow down his/her decision and improve accuracy of his/her movement. Thus, the electronic device 1 can provide more user-friendly service using positioning information.

Further, the first positioning result is obtained by satellite positioning that is performed by receiving and using first satellite signals (radio waves in the L1 band in the GPS), and the second positioning result is obtained by satellite positioning that is performed by receiving and using second satellite signals (radio waves in the L5 band in the GPS) different from the first satellite signals.

Information service based on positioning results obtained by using radio waves from satellites (especially positioning satellites) is widely usable outdoors, and hence highly convenient for the user. On the other hand, it takes time to obtain necessary parameters from data being sent in accordance with predetermined formats and obtain positioning results. Providing provisional information as soon as it is obtained even if it is slightly less accurate than the information obtained in the end reduces user's wait time without information.

Further, the information, which is output, is navigation information showing (indicating) a route(s) from the current position of the electronic device 1 to a destination. In the case of navigation information, it is a waste of time for the user to wait with no information, whereas at the start point, he/she can start moving without high-accuracy position information. Hence, providing information at two stages, namely, promptly providing lower-accuracy position information and thereafter providing higher-accuracy position information, is very convenient for the user.

Further, in response to obtaining the second positioning result, the CPU 11 as the first processor generates the navigation information by distinguishing between the right side and left side of a road on the route. In the case of navigation in a city or the like, it is often not easy for the user to cross a road or change his/her direction. Hence, distinguishing between the right side and the left side of a road and setting a more appropriate travel route further improves usefulness of navigation.

The electronic device 4 of the second embodiment includes the communication unit 45 that communicates with an external device(s). The CPU 41 as the first processor may obtain, via the communication unit 45, the first positioning result and the second positioning result as positioning results of the destination from the electronic device 1 as an external device to the electronic device 4 (Step S101a and Step S112 in FIG. 6), and generate the navigation information on the basis of each of the positioning results. That is, in the case too where a destination is set by successively obtaining, as positioning information from an external device, lower-accuracy positioning information, for which time required from start of reception of radio waves to obtainment of a positioning result is relatively short, and higher-accuracy positioning information, for which the abovementioned required time is relatively long, the wait time before start of movement is reduced, and the accuracy of the arrival point at the destination and the route to the destination is improved. Thus, the electronic device 4 improves user's convenience.

The electronic device 1 of the first embodiment may include the first positioning unit 171 that performs positioning by receiving and using first radio signals (radio waves in the L1 band) and the second positioning unit 172 that performs positioning with higher positioning accuracy than the first positioning unit 171 by receiving and using second radio signals (radio waves in the L5 band). The CPU 11 as the first processor obtains a positioning result by the first positioning unit 171 as the first positioning result and obtains a positioning result by the second positioning unit 172 as the second positioning result (Step S104), and generates the navigation information from the current position indicated by the obtained positioning result(s) to the destination (Step S107).

In the case (e.g., first embodiment) where satellite positioning is performed by a device that generates and outputs information, the device can easily generate and output information by successively and appropriately reflecting positioning results and their levels of accuracy. Further, in this case, the device can establish the navigation operation alone without communicating with an external device. Hence, the configuration of the device for the information service is not a large-scale one.

The CPU 41 as the first processor distinguishes between lanes of a road on the route on the basis of the obtained second positioning result, and generates the navigation information including a lane(s) of the lanes for the direction of travel. In the case of vehicle navigation or the like, because there are many roads having lanes for respective directions of travel, a point on a lane opposite a destination may be insufficient as an arrival point. Providing information based on higher-accuracy destination information and/or higher-accuracy current position information to allow a vehicle (user) to arrive at a point on a proper lane in the end enhances user's convenience.

In the electronic device 4a of the third embodiment, the CPU 41 as the first processor obtains the congestion status of each of the lanes of the road, and generates the navigation information by taking account of the obtained congestion status. Conventional navigation can only deal with overall congestion due to suspension of traffic or blockage of some lanes. On the other hand, the electronic device 4a determines the congestion status of each lane, and hence can selectively determine congestion on part of a road, such as congestion on a right-turn lane and/or a left-turn lane, and therefore can provide the user with more convenient information.

In response to not obtaining the second positioning result and in response to a branching point being present, the CPU 41 as the first processor generates the navigation information such that the branching point is noticeable, the branching point being a point at which the route branches into routes from which the CPU 41 selects a route in response to obtaining the second positioning result. That is, if a vehicle (user) moves forward in a direction from a branching point without obtaining higher-accuracy information, he/she may find when later obtaining higher-accuracy information that a route that the vehicle is taking is a detour or takes long time, and therefore the vehicle may provisionally move forward to a point that does not cause a problem. If higher-accuracy information is obtained before the vehicle arrives at the branching point, no problem occurs and time required for vehicle dispatch is reduced. Even if higher-accuracy information is not obtained before the vehicle arrives at the branching point, time taken by the vehicle to arrive at a destination can be reduced, for example, by the vehicle waiting/stopping near the branching point.

Further, in response to not obtaining the second positioning result, the CPU 41 as the first processor may generate the navigation information showing (indicating) routes from which the CPU 41 selects the route in response to obtaining the second positioning result. Regardless of the above, both/all routes from a branching point forward may be displayed in parallel, or routes on which a vehicle (user) may arrive at a destination at around the same time depending on their congestion statuses or the like may be displayed in parallel. In the case where lower-accuracy position information is sufficient and hence it is unnecessary to obtain higher-accuracy position information, routes in both directions of travel may be displayed in parallel. The case may be a case where a road at a destination is not a divided road or a case where a vehicle can easily make a turn (U-turn) at the site, and hence it does not matter which direction a vehicle faces when arriving at a destination. Further, if the program(s) 121 is capable of determining on the basis of the map data 122 which route is more appropriate, routes that are displayed in parallel may be prioritized.

The information processing system 100 of the second embodiment includes the electronic device 4 including the CPU 41 as the first processor and the electronic device 1 as an external device to the electronic device 4. The electronic device 1 includes the CPU 11 as the second processor. The CPU 11 obtains a third positioning result from the first positioning unit 171 that performs positioning by receiving and using third radio signals (radio waves in the L1 band) from a (third) group of positioning satellites; obtains a fourth positioning result from the second positioning unit 172 that performs positioning with higher positioning accuracy than the first positioning unit 171 by receiving and using fourth radio signals (radio waves in the L5 band) from a (fourth) group of positioning satellites; in response to the first positioning unit 171 obtaining the third positioning result (Step S204 in FIG. 7), outputs the third positioning result as the first positioning result to the electronic device 4 via the communication unit 15 (Step S205 in FIG. 7); and in response to the second positioning unit 172 obtaining the fourth positioning result (Step S207 in FIG. 7), outputs the fourth positioning result as the second positioning result to the electronic device 4 via the communication unit 15 (Step S208 in FIG. 7). Thus, the technology of successively obtaining positioning data of two levels of accuracy from an external device, thereby improving accuracy of outputting information using a positioning result, makes it possible to promptly start to provide the user of the electronic device 4 with information and also provide the user with higher-accuracy information as soon as it becomes available, thereby improving user's convenience.

The information processing system 100a of the third embodiment includes the electronic device 4a as an information processing device and the electronic device 1 as an external device to the electronic device 4a. The electronic device 4a includes the CPU 41 as the first processor, and the electronic device 1 includes the CPU 11 as the second processor. The CPU 41 obtains a first positioning result obtained by the first positioning unit 471, which receives radio waves in the L1 band, performing positioning by receiving and using first radio signals from a first group of positioning satellites, and obtains a second positioning result obtained by the second positioning unit 472, which receives radio waves in the L5 band, performing positioning by receiving and using second radio signals from a second group of positioning satellites. The electronic device 1 sends, to the electronic device 4a via the communication unit 15, a third positioning result obtained by the first positioning unit 171, which performs positioning by receiving and using third radio signals in the L1 band from a third group of positioning satellites, and sends, to the electronic device 4a via the communication unit 15, a fourth positioning result obtained by the second positioning unit 172, which performs positioning by receiving and using fourth radio signals in the L5 band from a fourth group of positioning satellites. The CPU 41 of the electronic device 4a, in response to obtaining the first positioning result and the third positioning result, generates, on the basis of the first positioning result and the third positioning result, third information having a content(s) corresponding to the positioning accuracy of the first positioning result and the positioning accuracy of the third positioning result; in response to obtaining the second positioning result and the third positioning result, generates, on the basis of the second positioning result and the third positioning result, fourth information having a content(s) corresponding to the positioning accuracy of the second positioning result and the positioning accuracy of the third positioning result; in response to obtaining the first positioning result and the fourth positioning result, generates, on the basis of the first positioning result and the fourth positioning result, fifth information having a content(s) corresponding to the positioning accuracy of the first positioning result and the positioning accuracy of the fourth positioning result; in response to obtaining the second positioning result and the fourth positioning result, generates, on the basis of the second positioning result and the fourth positioning result, sixth information having a content(s) corresponding to the positioning accuracy of the second positioning result and the positioning accuracy of the fourth positioning result; and outputs the generated third information to sixth information for display. The third information to the sixth information are different from one another. That is, the electronic device 4a starts to output the information on the basis of the positioning data initially obtained by the first positioning units 171, 471 (Step S106 in FIG. 9), and can improve the accuracy of the outputting information as soon as at least one of the positioning data by the second positioning units 172, 472 is obtained (Step S106, Step S107 and Step S114 in FIG. 9).

In this case too, it is possible to promptly start to provide the user of the electronic device 4a with information and also provide the user with higher-accuracy information as soon as it becomes available, thereby improving user's convenience.

The information processing method of the above embodiments includes: obtaining a first positioning result; obtaining a second positioning result higher in positioning accuracy than the first positioning result; in response to obtaining the first positioning result, generating, on the basis of the first positioning result, first information having a content(s) corresponding to the positioning accuracy of the first positioning result; in response to obtaining the second positioning result, generating, on the basis of the second positioning result, second information having a content(s) corresponding to the positioning accuracy of the second positioning result, the second information being different from the first information; and outputting the generated first information and second information for display.

Thus, in the case where two types of positioning results of different levels of accuracy can be obtained, in response to a first positioning result of lower accuracy being obtained, information is generated with a content(s) at accuracy available by this first positioning result and output. This allows the user, who is eager to obtain information, to make a provisional decision and a provisional movement without keeping him/her waiting for a long time, namely, until a second positioning result is obtained. Thereafter, as soon as a second positioning result is obtained, higher-accuracy information is output by replacing the outputting information. This allows the user (with whom information is provided) to, on the basis of a higher-accuracy position, narrow down his/her decision and improve accuracy of his/her movement. Thus, the information processing method can improve user's convenience of the service using positioning information.

The program(s) 121/421 of the above embodiments causes a computer (electronic device 1/4/4a) to: obtain a first positioning result; obtain a second positioning result higher in positioning accuracy than the first positioning result; and generate and output information using each obtained positioning result. The program(s) 121/421 causes the computer to: in response to obtaining the first positioning result, generate, on the basis of the first positioning result, first information having a content(s) corresponding to the positioning accuracy of the first positioning result; and in response to obtaining the second positioning result, generate, on the basis of the second positioning result, second information having a content(s) corresponding to the positioning accuracy of the second positioning result, the second information being different from the first information.

Installing the program(s) 121/421 into a computer from the non-transitory computer readable storage medium that stores the program(s) 121/421 makes it easy to perform the process for obtaining positioning data of two levels of accuracy and outputting information. This makes it easy for a general-purpose electronic device or the like to provide more user-friendly service using positioning information.

The present invention is not limited to the above embodiments but can be modified in a variety of respects.

For example, in the case where a device performs positioning to identify its current position with two levels of accuracy at two stages described above and obtains a destination from an external device, the external device may not be limited to a device that sends positioning results but may be a device that sends information input by its user, for example. In this case, higher-accuracy information may be obtained, for example, by an operator of a vehicle-dispatch center obtaining additional information from the user.

Further, in the above embodiments, navigation information is generated and output. However, as far as the information service is service that provides information using positioning results, it is not limited. For example, it may be service that provides shop/store information, traffic information, parking information and/or the like near the current position or a destination for which positioning results are obtained, or may be service that simply provides logs/records of movement loci. Further, in the above embodiments, navigation information is output to be displayed, but not limited thereto. For example, the navigation information, which indicates a route(s), may be output as audio.

Further, in the above embodiments, positioning by receiving and using radio waves in the L1 band in the GPS and positioning by receiving and using radio waves in the L5 band in the GPS are performed. However, as far as the same condition is satisfied, namely, as far as, of two types of positioning, a positioning result by lower-accuracy positioning is often obtained first, and a positioning result by higher-accuracy positioning is obtained thereafter, the present invention is not limited to the embodiments. Radio waves sent from positioning satellites of another satellite positioning system, such as the GLONASS or the Galileo, may be used. The radio waves sent from positioning satellites are not limited to radio waves of wavelengths sent from positioning satellites of one positioning satellite system but may be those sent from positioning satellites of two or more positioning satellite systems. All groups of the first group of positioning satellites (first positioning satellites) that send first radio signals in the L1 band and the second group of positioning satellites (second positioning satellites) that send second radio signals in the L5 band, the first radio signals and the second radio signals being received by the electronic device 4/4a, and the third group of positioning satellites (third positioning satellites) that send third radio signals in the L1 band and the fourth group of positioning satellites (fourth positioning satellites) that send fourth radio signals in the L5 band, the third radio signals and the fourth radio signals being received by the electronic device 1, may be the same, or some or all of the groups may be different from one another. Further, positioning results using radio waves of not positioning satellites may be obtained. For example, an approximate position may be obtained at an early stage by communications with an antenna for cellphones.

Further, in the above embodiment(s), navigation by a smartphone or a smartwatch is targeted at a pedestrian but may be targeted at a bicycle or the like. The target may be switched in response to an input operation by its user, or may be automatically switched by a sensor or the like detecting a change in its movement status (e.g., in speed of movement).

Further, where to output information for display is not limited to the display screen of a device that generates the information. For example, a user who uses both a smartphone and a smartwatch may cause output images by the smartphone to be displayed on the display screen of the smartwatch, or vice versa.

Further, for example, in cases, which include warm start and hot start, where second radio signals (radio waves in the L5 band) are obtained at almost the same time as or before first radio signals (radio waves in the L1 band) are obtained, the above-described steps may be appropriately selected to generate information based on L5 positioning from the beginning.

Further, in the above embodiment(s), until a second positioning result is obtained, two types of routes are identified, and its branching point is displayed so as to be recognized by the user. However, if there is a waiting point in front of the branching point, the waiting point may also be output.

Further, the configurations/components, process contents/details and procedures described in the above three types of embodiments can be arbitrarily combined or partly removed as far as there is no contradiction or inconsistency.

Further, in the above, the storage 12/42 including a nonvolatile memory, such as a flash memory, is used as a computer readable storage medium storing the program(s) 121/421 for the navigation control of the present disclosure. However, this is not a limitation. As the computer readable storage medium, another type of nonvolatile memory, such as HDD (Hard Disk Drive) or MRAM, or a portable recording medium, such as CD-ROM or DVD disk, can also be used. Further, as a medium to provide data of the program(s) of the present disclosure via a communication line, a carrier wave can be used.

In addition, the specific configurations/components, process contents/details, procedures and so forth described in the above embodiments can be appropriately modified within a range not departing from the scope of the present invention.

Although several embodiments of the present disclosure have been described above, the scope of the present invention is not limited to the embodiments described above but includes the scope of the present invention described in claims below and the scope of their equivalents.

What is claimed is:

1. An information processing system comprising:
an information processing device including a first processor that, in operation:
obtains a first positioning result and a second positioning result higher in positioning accuracy than the first positioning result;
in response to obtaining the first positioning result, generates, based on the first positioning result, first information having a content corresponding to the positioning accuracy of the first positioning result as information;
in response to obtaining the second positioning result, generates, based on the second positioning result, second information having a content corresponding to the positioning accuracy of the second positioning result, the second information being different from the first information, as the information; and
outputs the generated information; and
an electronic device including a second processor,
wherein the first positioning result is obtained by positioning that is performed by receiving and using first radio signals from a first group of positioning satellites,
wherein the second positioning result is obtained by positioning that is performed by receiving and using second radio signals from a second group of positioning satellites,
wherein the second processor, in operation:
obtains a third positioning result obtained by positioning that is performed by receiving and using third radio signals from a third group of positioning satellites;
obtains a fourth positioning result obtained by positioning that is performed by receiving and using fourth radio signals from a fourth group of positioning satellites, the fourth positioning result being higher in positioning accuracy than the third positioning result;
outputs the third positioning result as the first positioning result to the information processing device via a communication unit; and
outputs the fourth positioning result as the second positioning result to the information processing device via the communication unit, and
wherein two or more groups of the first group of positioning satellites, the second group of positioning satellites, the third group of positioning satellites and the fourth group of positioning satellites are identical or different from one another.

2. The information processing system according to claim 1, wherein the information processing device further comprises:
a display,
wherein the first processor, in operation:
in response to obtaining the first positioning result, generates, based on the first positioning result, first information having a content corresponding to the positioning accuracy of the first positioning result as first display information, and causes the display to display the first display information; and
in response to obtaining the second positioning result after causing the display to display the first display information, generates, based on the second positioning result, second information having a content corresponding to the positioning accuracy of the second positioning result, the second information being different from the first information, as second display information, and causes the display to display the second display information by replacing the first display information with the second display information.

3. The information processing system according to claim 2,
wherein the first positioning result is obtained by satellite positioning that is performed by receiving and using first satellite signals, and
wherein the second positioning result is obtained by satellite positioning that is performed by receiving and using second satellite signals different from the first satellite signals.

4. The information processing system according to claim 2, wherein the first display information and the second display information are navigation information indicating a route from a current position of the information processing device to a destination.

5. The information processing system according to claim 4,
wherein in response to obtaining the first positioning result, the first processor generates the navigation information without distinguishing between a right side and a left side of a road on the route, and
wherein in response to obtaining the second positioning result, the first processor generates the navigation information by distinguishing between the right side and the left side of the road on the route.

6. The information processing system according to claim 4, wherein the first processor obtains, via the communication unit, the first positioning result and the second positioning result as positioning results of the destination from an external device, and generates the navigation information based on each of the positioning results.

7. The information processing system according to claim 4, wherein the first processor distinguishes between lanes of a road on the route based on the second positioning result, and generates the navigation information including a lane of the lanes for a direction of travel.

8. The information processing system according to claim 7, wherein the first processor obtains a congestion status of each of the lanes of the road, and generates the navigation information by taking account of the congestion status.

9. The information processing system according to claim 4, wherein in response to not obtaining the second positioning result and in response to a branching point being present, the first processor generates the navigation information such that the branching point is noticeable, the branching point being a point at which the route branches into routes from which the first processor selects one of the routes in response to obtaining the second positioning result.

10. The information processing system according to claim 4, wherein in response to not obtaining the second positioning result, the first processor generates the navigation information indicating routes from which the first processor selects the route in response to obtaining the second positioning result.

11. An information processing system comprising:
an information processing device including a first processor that, in operation:
obtains, as a first positioning result, a positioning result obtained by positioning that is performed by receiving and using first radio signals from a first group of positioning satellites;
obtains, as a second positioning result, a positioning result obtained by positioning that is performed by receiving and using second radio signals from a second group of positioning satellites, the second positioning result being higher in positioning accuracy than the first positioning result; and
obtains a third positioning result and a fourth positioning result higher in positioning accuracy than the third positioning result from an electronic device via a first communication unit; and
the electronic device including a second processor that, in operation:
outputs, as the third positioning result, a positioning result obtained by positioning that is performed by receiving and using third radio signals from a third group of positioning satellites to the information processing device via a second communication unit; and
outputs, as the fourth positioning result, a positioning result obtained by positioning that is performed by receiving and using fourth radio signals from a fourth group of positioning satellites to the information processing device via the second communication unit,
wherein the first processor of the information processing device, in operation:
in response to obtaining the first positioning result and the third positioning result, generates, based on the first positioning result and the third positioning result, third information having a content corresponding to the positioning accuracy of the first positioning result and the positioning accuracy of the third positioning result as information;
in response to obtaining the second positioning result and the third positioning result, generates, based on the second positioning result and the third positioning result, fourth information having a content corresponding to the positioning accuracy of the second positioning result and the positioning accuracy of the third positioning result, the fourth information being different from the third information, as the information;
in response to obtaining the first positioning result and the fourth positioning result, generates, based on the first positioning result and the fourth positioning result, fifth information having a content corresponding to the positioning accuracy of the first positioning result and the positioning accuracy of the fourth positioning result, the fifth information being different from the third information and the fourth information, as the information;

in response to obtaining the second positioning result and the fourth positioning result, generates, based on the second positioning result and the fourth positioning result, sixth information having a content corresponding to the positioning accuracy of the second positioning result and the positioning accuracy of the fourth positioning result, the sixth information being different from the third information, the fourth information and the fifth information, as the information; and outputs the generated information, and wherein two or more groups of the first group of positioning satellites, the second group of positioning satellites, the third group of positioning satellites and the fourth group of positioning satellites are identical or different from one another.

12. The information processing system according to claim 11, wherein the information processing device further comprises:

a display, wherein the first processor, in operation:

in response to obtaining the first positioning result, generates, based on the first positioning result, first information having a content corresponding to the positioning accuracy of the first positioning result as first display information, and causes the display to display the first display information; and in response to obtaining the second positioning result after causing the display to display the first display information, generates, based on the second positioning result, second information having a content corresponding to the positioning accuracy of the second positioning result, the second information being different from the first information, as second display information, and causes the display to display the second display information by replacing the first display information with the second display information.

13. The information processing system according to claim 12, wherein the first display information and the second display information are navigation information indicating a route from a current position of the information processing device to a destination.

14. The information processing system according to claim 13, wherein in response to obtaining the first positioning result, the first processor generates the navigation information without distinguishing between a right side and a left side of a road on the route, and wherein in response to obtaining the second positioning result, the first processor generates the navigation information by distinguishing between the right side and the left side of the road on the route.

15. The information processing system according to claim 13, wherein the first processor obtains, via the first communication unit, the first positioning result and the second positioning result as positioning results of the destination from an external device, and generates the navigation information based on each of the positioning results.

16. The information processing system according to claim 13, wherein the first processor distinguishes between lanes of a road on the route based on the second positioning result, and generates the navigation information including a lane of the lanes for a direction of travel.

17. The information processing system according to claim 16, wherein the first processor obtains a congestion status of each of the lanes of the road, and generates the navigation information by taking account of the congestion status.

18. The information processing system according to claim 13, wherein in response to not obtaining the second positioning result and in response to a branching point being present, the first processor generates the navigation information such that the branching point is noticeable, the branching point being a point at which the route branches into routes from which the first processor selects one of the routes in response to obtaining the second positioning result.

19. The information processing system according to claim 13, wherein in response to not obtaining the second positioning result, the first processor generates the navigation information indicating routes from which the first processor selects the route in response to obtaining the second positioning result.

20. The information processing system according to claim 11, wherein the first positioning result is obtained by satellite positioning that is performed by receiving and using first satellite signals, and wherein the second positioning result is obtained by satellite positioning that is performed by receiving and using second satellite signals different from the first satellite signals.

* * * * *